US006525674B1

(12) United States Patent
Kelly et al.

(10) Patent No.: US 6,525,674 B1
(45) **Date of Patent: *Feb. 25, 2003**

(54) CONDITIONAL HAZARD ALERTING DISPLAY

(75) Inventors: Wallace E. Kelly, Apex, NC (US); Serdar Uckun, Palo Alto, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/924,714

(22) Filed: Aug. 8, 2001

(51) Int. Cl.$^{7}$ .................................. G08B 23/00

(52) U.S. Cl. .................... 340/970; 340/961; 342/65; 701/14; 701/301

(58) Field of Search .......................... 340/970, 977, 340/961, 963, 979; 701/9, 14, 4, 301, 120; 342/29, 65

(56) References Cited

U.S. PATENT DOCUMENTS

| | | | | | |
|---|---|---|---|---|---|
| 4,224,669 | A | * | 9/1980 | Brame | |
| 4,646,244 | A | * | 2/1987 | Bateman et al. | 342/65 |
| 4,862,373 | A | * | 8/1989 | Meng | |
| 4,914,436 | A | * | 4/1990 | Bateman et al. | 340/970 |
| 4,914,733 | A | * | 4/1990 | Gralnick | 340/961 |
| 5,086,396 | A | * | 2/1992 | Waruszewski, Jr. | |
| 5,185,606 | A | * | 2/1993 | Verbaarschot et al. | 340/961 |
| 5,631,640 | A | * | 5/1997 | Deis et al. | 340/961 |
| 6,111,525 | A | * | 8/2000 | Berlioz et al. | 340/971 |
| 6,317,690 | B1 | * | 11/2001 | Gia | 340/961 |

* cited by examiner

*Primary Examiner*—Brent A. Swarthout
(74) *Attorney, Agent, or Firm*—Nathan O. Jensen; Kyle Eppele

(57) ABSTRACT

A conditional TAWS algorithm, system and method for providing advanced warnings of potential hazard situations which could result from changes in heading and vertical speed.

15 Claims, 2 Drawing Sheets

200
204 FMS
206 FCC
208 AUTOPILOT
209 WEATHER RADAR
202 EGPWS
212 ILS / MLS RECEIVERS
210 DISPLAY

CONDITIONAL HAZARD ALERTING DISPLAY

CROSS REFERENCE TO RELATED APPLICATIONS

This application relates to an application entitled "TERRAIN AWARENESS SYSTEM HAVING NUISANCE ALARM FILTER FOR USE DURING APPROACH" by Wallace Kelly and Serdar Uckun, having Ser. No. 09/924,821 and field Aug. 08, 2001, and also relates to another application entitled "METHOD AND SYSTEM FOR PROVIDING GROUND PROXIMITY WARNINGS", by the same inventors, to Ser. No. 09/924,894, now U.S. Pat. No. 6,452,511, both of said applications being filed concurrently herewith and assigned to a common assignee, said applications being incorporated herein in their entirety by this reference.

FIELD OF THE INVENTION

The present invention generally relates to avionics, and more particularly relates to in-flight hazard warning systems, and even more particularly relates to methods and systems for displaying information to a pilot regarding multiple types of conditional hazards.

BACKGROUND OF THE INVENTION

In recent years, much effort has been expended in reducing aviation accidents. Enhanced Ground Proximity Warning Systems (EGPWS) have been used in the industry to warn pilots of imminent controlled flight into terrain (CFIT). Similarly, Traffic Alert and Collision Avoidance Systems (TCAS) have been used to warn pilots of aircraft in the vicinity of their aircraft.

While these GPWSs and TCASs have been used extensively in the past, they do have some drawbacks. These EGPWSs are reactive systems in the sense that they react to the current heading, velocity, altitude, and position of the aircraft. They do not anticipate that the aircraft might make an abrupt change in heading during flight, which would then trigger an alarm, but would not provide sufficient advance warning for the pilot to make a well-reasoned corrective action. TCASs generally display the location of nearby aircraft and issue corrective commands when a collision is imminent. However, TCASs also do not anticipate that the aircraft might make an abrupt change in heading during flight, which might then trigger an alarm.

Consequently, there exists a need for improved methods and systems for providing and displaying advance warnings of potential hazard situations in an efficient manner.

SUMMARY OF THE INVENTION

It is an object of the present invention to provide a system and method for displaying advance warning of potential hazard situations in an efficient manner.

It is a feature of the present invention to utilize displays with "no-go" zones and "don't do" maneuvers.

It is another feature of the present invention to base the hazard displays on various inputs regarding terrain, traffic, weather and Special Use Airspaces (SUA).

It is another feature of the present invention to anticipate both planned and errant and speed changes.

It is another feature of the present invention to provide hazard alerts which are and aurally distinguishable with respect to differing severity, threat types and ce of the threat.

It is an advantage of the present invention to achieve improved efficiency in advanced warning of potential hazard situations.

The present invention is an apparatus and method for providing advanced warning of potential hazard situations which are designed to satisfy the aforementioned needs, provide the previously stated objects, include the above-listed features, and achieve the already articulated advantages. The present invention is carried out in an "untimely warning-less" manner in a sense that the potential for warnings to be issued without sufficient time for the pilot to make a well-reasoned response has been greatly reduced.

Accordingly, the present invention is a system and method for displaying multiple types of conditional hazard alerts which considers potential future course and speed changes when generating hazard awareness warnings.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
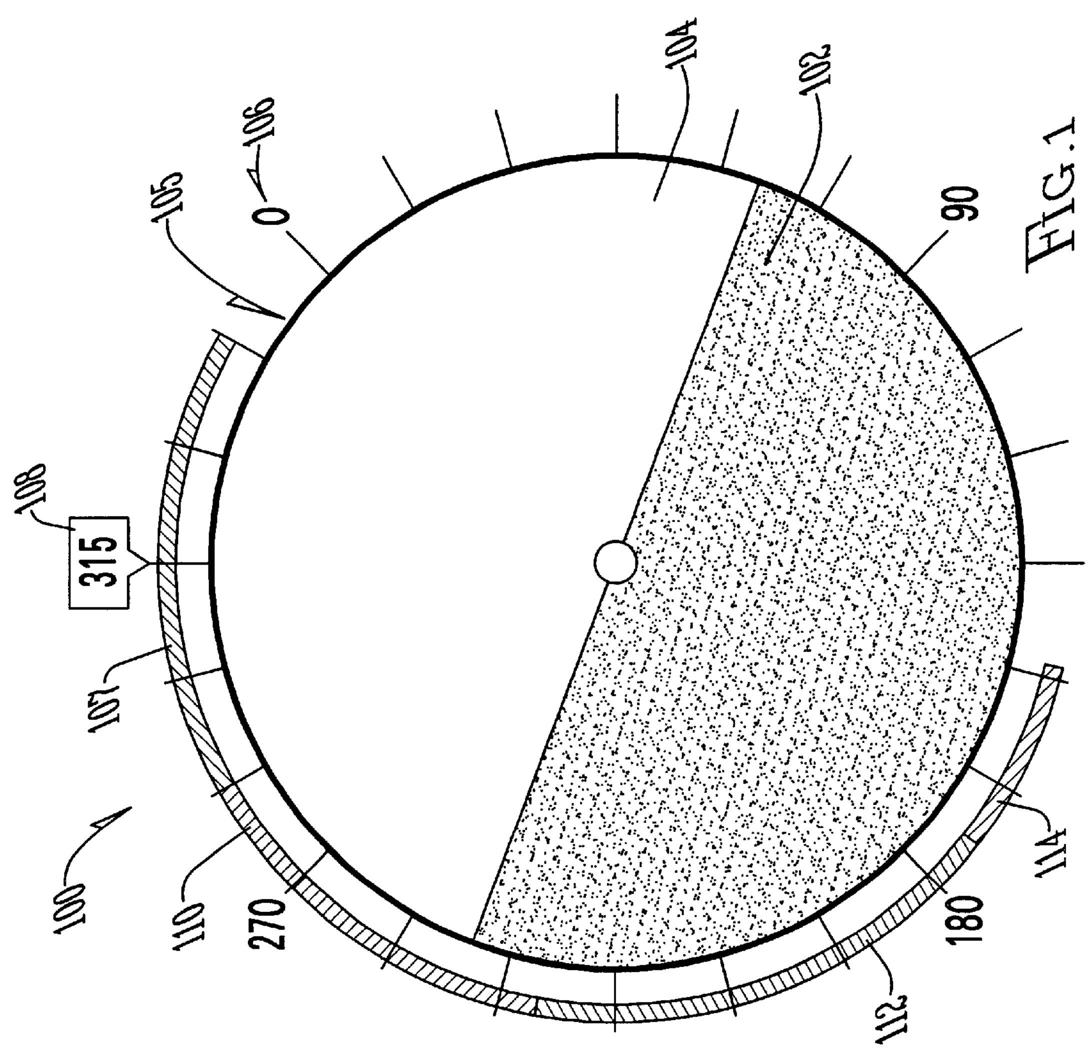
FIG. 1 is an artificial horizon indicator of the present invention which includes a compass rose disposed having undesirable course headings marked with an indicating bar.

Now referring to the drawings wherein like numerals refer to like matter throughout, and more specifically referring to FIG. 1, there is shown an artificial horizon indicator of the present invention, generally designated 100 having a terrain section 102 and a sky section 104, as is well known in the art. Also shown in FIG. 1 is compass rose 105, which is disposed about the centrally disposed artificial horizon indicator 100; compass rose 105 has a north course marking 106 and a current course marking 108. Current course marking 108 is shown at the top of compass rose 105 and is shown with a heading of 315 degrees or a northwest direction. Compass rose 105 is shown having a first low-level undesirable course heading alert 110 which spans from approximately 285 degrees to 240 degrees. First low-level undesirable course heading alert 110 is used to denote an area of low-level alerts. These low-level alerts could be from several sources. One example would be from a potential CFIT situation if the heading were held for a predetermined extended period of time; e.g., for 1–2 minutes, or if it were a thunderstorm which might be encountered in 30 seconds. Also shown is a critical undesirable course heading alert 112, which is indicated with a different marking and may be flashing, etc. Critical undesirable course heading alert 112 might be used to denote a heading which would result in CFIT in less than 30 seconds. A critical undesirable course heading alert 112 might also be appropriate if the aircraft would enter an SUA in 45 seconds. The timing of alerts and the types of hazard all can be used to determine whether a first low-level undesirable course heading alert 110 is issued or a critical undesirable course heading alert 112 is issued. A second low-level undesirable course heading alert 114 is also shown, which is similar to first low-level undesirable course heading alert 110. In some embodiments of the present invention, it may be desirable to display a safe heading bar 107 as a green bar or otherwise.

Figure 2:
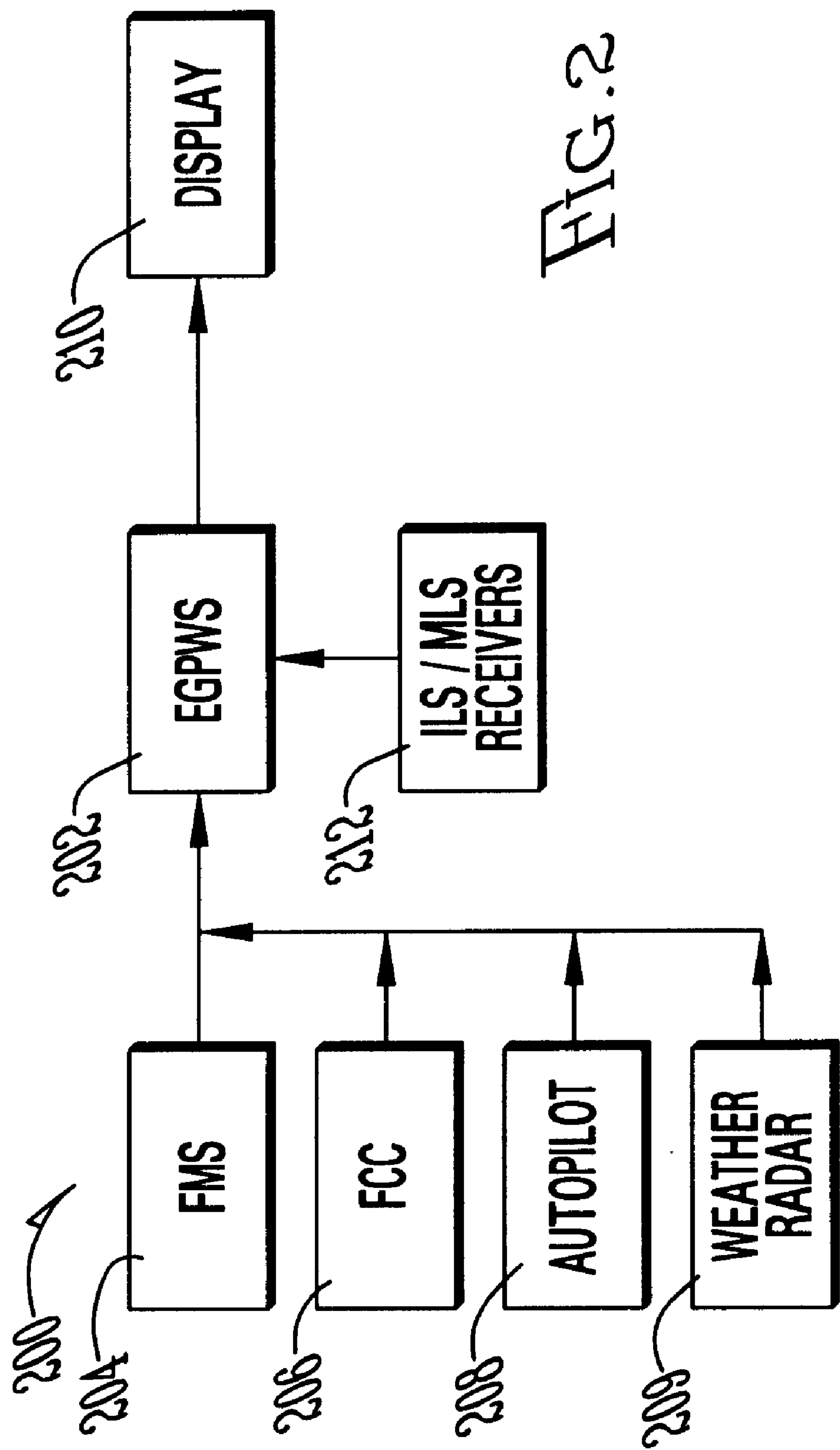
FIG. 2 is a block diagram view of a system of the present invention.

A more detailed understanding of the present invention can be achieved by now referring to FIG. 2, which shows a conditional TAWS 200 of the present invention, which is assumed to be disposed on a conditional TAWS protected aircraft. Conditional TAWS 200 includes a new EGPWS 202 which is similar to well-known prior art EGPWSs with the primary exception that it has an algorithm and functionality to generate TAWS warnings based upon anticipated errant actions of a pilot or autopilot, such as described above with regard to FIG. 1, and it makes determinations of prohibited heading/course deviations at various points along a projected flight path. EGPWS 202 may be similar to EGPWSs previously sold by Sundstrand and currently sold by Honeywell. Such a conditional TAWS 200 will not only include the EGPWS 202, but it will also include data input from flight management systems (FMS) 204, flight control computer (FCC) 206, and autopilot 208, weather radar 209 and ILS/MLS receivers 212, which can individually or collectively provide information which the EGPWS 202 can used to predict times and positions where a pilot might make an errant change in heading/course which would or could result in CFIT or encountering another hazard and a resulting warning.

In one embodiment of the present invention, the conditional TAWS 200 continuously calculates prohibited immediate heading/course changes; i.e., heading/course changes which, if made immediately, would result in an immediate issuance of a TAWS warning under prior art TAWS systems. Then a visual or aural indication of the current prohibited headings or changes in headings will be provided to the pilot.

Figure 3:
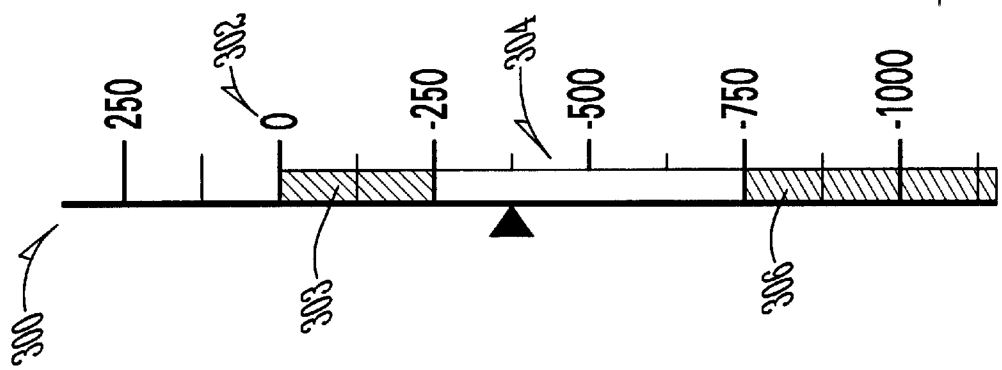
FIG. 3 is a display of the present invention showing a vertical speed indicator having undesirable vertical speeds depicted with an indicating bar.

Conditional TAWS 200 includes a display 210 which could be similar to that which is described in FIGS. 1 and 3. This display gives a pilot an instantaneous display of the heading changes which are "prohibited." Numerous other instantaneous displays of prohibited heading changes are contemplated as well.

Now referring to FIG. 3, there is shown just one example of many possible examples of how a pilot might be provided with information relating to vertical speed prohibitions. FIG. 3 includes an enhanced vertical speed indicator 300, which includes a level flight marker 302, which indicates no vertical speed. Low-level vertical speed alert indicator bar 304 is used to denote lower level hazard, which may be a CFIT situation if the vertical speed next to the low-level vertical speed alert indicator bar 304 were maintained for 1–2 minutes, or it may be indicating an encounter with an SUA area or a thunderstorm or potential windshear. Critical vertical speed alert indicator bar 306 is used to indicate a more critical hazard, such as a CFIT situation in 30 seconds. The criteria for what type of hazard and the immediacy of the threat are matters of designer's choice. It is believed that with the aid of this description and a sound working knowledge of prior art aviation hazard warning systems, a person skilled in the art could make and use the invention claimed herein. In some embodiments, it may be preferred to display a safe descent rate bar 303, which could be a green line or otherwise. It also may be desirable in some embodiments to include optional ILS/MLS receivers 212 as inputs to the EGPWS 202.

The above description uses negative vertical speed and CFIT as the potential problems. It should be understood that the present invention is applicable to positive vertical speeds as well. For example, a hazard may exist if an aircraft were to climb at an excessive rate. These hazards may be other aircraft, such as indicated by a TCAS or weather hazards, such as icing conditions which may be identified by a weather radar or a weather information which is uplinked via a data radio.

In operation, the apparatus and method of the present invention as described in FIGS. 1–3, could function as follows:

1. An algorithm is used to generate TAWS alerts based upon a projected position, velocity, and heading of the aircraft, as well as other factors. For example, the algorithm may, for each 5 degrees of heading on a course deviation indicator or other indicator, determine if a hazard would be encountered if this heading were maintained for 1–2 minutes.
2. This determination is repeated for every different prospective heading.
3. In areas where a hazard would be encountered after maintaining that heading for 1–2 minutes, then a low-level undesirable course heading alert would be generated for that area. This alert could be a yellow band or other similar indication.
4. The process is repeated to determine if a hazard would be encountered within 30 seconds.
5. In areas where a hazard would be encountered within 30 seconds and that hazard is a critical hazard, such as a CFIT situation, then a critical undesirable course heading alert is created. This alert might be a red band or a flashing yellow band or other visual and/or aural notification.

This process of FIG. 1 creates a "no go zone" where the pilot is warned in advance that heading in the banded directions will result in a hazard.

Similarly, with regard to the process for generating FIG. 3, the system could operate as follows.

1. An algorithm makes a predicted determination of a CFIT or other hazard by determining if a CFIT situation would exist if a given vertical speed were maintained for a given time interval, such as 1–2 minutes.
2. If a CFIT or other hazard were to occur within 1–2 minutes at that vertical speed, then a low-level vertical speed alert indicator bar 304 would appear on the vertical speed indicator for that vertical speed.
3. The process is repeated for increasing negative vertical speeds until it is determined that a CFIT situation would occur within 30 seconds.
4. Once it is determined that a CFIT situation would occur within 30 seconds, then the algorithm would generate a critical vertical speed alert indicator bar 306 for that vertical speed and all vertical speeds which represent an even faster descent rate.

The process described above for FIG. 3 essentially defines a "don't do maneuver", such as "don't dive at this rate".

Throughout this description, reference may be made to ground proximity warning systems, EGPWS, TAWS, GCAS, GPWS and ground prox, because it is believed that they are synonyms of each other and the various systems and proposed systems for giving a pilot a warning of a potential CFIT situation. Similarly, the terms "alarm", "alert", and "warning" are used interchangeably throughout this document. It is the intention of the present invention that any such system for providing advance CFIT warnings would benefit from the present invention and that the terms used in the claims are intended to mean any of these systems.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. An apparatus for assisting in reducing encounters with aviation hazards, the apparatus comprising:

a ground proximity warning system which is adapted and configured to provide warnings to a pilot of possible controlled flight into terrain situations, based on at least current position, current speed and current heading of an aircraft;

a first algorithm, adapted and configured to cooperate with said ground proximity warning system, said first algorithm makes a determination for each of a plurality of headings as to whether a hazard would be encountered if said each of a plurality of headings were maintained for a predetermined duration;

wherein said each of a plurality of headings is different from said current heading of said aircraft; and, p1 a display, responsive to said determination for each of a plurality of headings, the display adapted and configured to display visual alerts when a determination is made that a hazard will be encountered.

2. An apparatus of claim 1 wherein:

said display is adapted and configured for displaying to a pilot a plurality of prohibited headings which would result in encountering a hazard if said plurality of prohibited headings were to become said current heading for a predetermined time interval.

3. An apparatus of claim 2 further comprising:

a compass rose which has a first low-level undesirable course heading alert band and a critical undesirable course heading alert band associated with said plurality of prohibited headings.

4. An apparatus of claim 3 further comprising:

a second algorithm, adapted and configured to cooperate with said ground proximity warning system, said second algorithm makes a determination for each of a plurality of negative vertical speeds as to whether a hazard would be encountered if said each of a plurality of negative vertical speeds were maintained for a predetermined duration; and said display is responsive to said determination for each of a plurality of negative vertical speeds, the display further adapted and configured to display visual alerts when a determination is made, with said second algorithm, that a hazard will be encountered.

5. An apparatus of claim 4 wherein said first algorithm and said second algorithm are executed by said ground proximity warning system.

6. An apparatus of claim 5 wherein said first algorithm and said second algorithm are portions of an algorithm used by said ground proximity warning system to provide warnings based upon current heading and current vertical speed.

7. A method of reducing controlled flight into terrain comprising the steps of:

providing warnings to a pilot of possible controlled flight into terrain with a ground proximity warning system;

making a determination of potential noncurrent headings that, if implemented and maintained for a first predetermined duration, will result in encountering a hazard; and displaying to the pilot a plurality of prohibitions that are based on said determination.

8. A method of claim 7 wherein said plurality of prohibitions include prohibited headings.

9. A method of claim 7 wherein said plurality of prohibitions include multiple levels of alerts where differing levels of alerts depict different levels of threats.

10. A method of claim 9 further comprising the step of making a determination of potential negative vertical speeds which, if implemented and maintained for a second predetermined duration, would result in encountering a hazard.

11. A method of claim 10 further comprising the step of displaying a plurality of predicted prohibitions based upon said determination of potential negative vertical speeds.

12. A method of claim 11 wherein said predicted prohibitions are displayed as a first line disposed adjacent to a vertical speed indicator and a second line disposed adjacent to a vertical speed indicator, where said first line and said second line represent differing levels of threats based upon differing time intervals used as said second predetermined duration.

13. A system comprising:

a ground proximity warning system that is adapted and configured to generate warnings based upon current speed, current heading and current location of a protected aircraft;

an algorithm executed by said ground proximity warning system for making a determination of potential headings that, if implemented and maintained for a first predetermined duration, results in a hazardous situation; and a display providing information to a pilot relating to the potential headings that result in a hazardous situation of said protected aircraft, wherein said potential headings are depicted as bars disposed about a compass rose.

14. A system of claim 13 wherein said algorithm further makes a determination of potential negative vertical speeds and said display provides information relating to prohibitions regarding negative vertical speeds of said protected aircraft, wherein said prohibitions are in part, depicted as bars disposed about a vertical speed indicator.

15. A system of claim 14 wherein said algorithm is a portion of software used by said ground proximity warning system to generate warnings.

* * * * *